United States Patent [19]

Rode

[11] 4,067,585
[45] Jan. 10, 1978

[54] DEFORMABLE METALLIC ELEMENT
[75] Inventor: John E. Rode, Fonda, N.Y.
[73] Assignee: Temper Corporation, Fonda, N.Y.
[21] Appl. No.: 447,571
[22] Filed: Mar. 4, 1974

Related U.S. Application Data

[63] Continuation of Ser. No. 841,436, July 14, 1969, abandoned, which is a continuation-in-part of Ser. No. 181,219, Sept. 16, 1971, abandoned.

[51] Int. Cl.² .............................................. F16J 9/20
[52] U.S. Cl. ................................. 277/200; 277/205; 277/206 R; 277/236
[58] Field of Search ............... 277/200, 205, 236, 235, 277/206

[56] References Cited

U.S. PATENT DOCUMENTS

| 2,303,642 | 12/1942 | Hoy ................................. 277/95 X |
| 2,913,269 | 11/1959 | Bremer et al. ........................ 277/236 |
| 3,192,690 | 7/1965 | Taylor .............................. 277/205 X |
| 3,399,604 | 9/1968 | Shewmake et al. ...................... 92/47 |
| 3,519,278 | 7/1970 | Fuhrmann et al. ............... 277/206 X |
| 3,595,588 | 7/1971 | Rode .................................. 277/235 R |

FOREIGN PATENT DOCUMENTS

| 911,682 | 3/1946 | France ................................. 285/336 |
| 869,453 | 3/1953 | Germany ............................. 277/206 |

Primary Examiner—Richard E. Aegerter
Assistant Examiner—L. Footland
Attorney, Agent, or Firm—Albert L. Jeffers

[57] ABSTRACT

A deformable metallic element particularly characterized in that the element is formed of a hard resilient metal which undergoes work hardening when it is deformed beyond the elastic limit thereof. The element is made in the form of a relatively thin walled tubular member convoluted in longitudinal cross section and upon axial compression undergoes a first period of resilient deformation during which the compressive force increases substantially linearly followed by a second period of plastic deformation during which the compressive force remains constant.

The element of the present invention is particularly useful as a load member to create a predetermined load on a part which it is desired to maintain under a predetermined constant load.

5 Claims, 14 Drawing Figures

DEFORMABLE METALLIC ELEMENT

RELATED APPLICATION

The present application is a continuation of my copending Ser. No. 841,436, Filed July 14, 1969, and now abandoned and is a continuation-in-part of my copending application Ser. No. 181,219, Filed Sept. 16, 1971, also now abandoned.

The present invention is concerned with deformable metal elements especially adapted for use as load elements.

The present invention proposes the provision of a metallic element which is adapted for being compressed to the yield point of the material from which the element is made and which will thereafter compress under a substantially constant load for a substantial distance.

The present invention further proposes a provision of an element of the nature referred to which is convoluted or undulating in cross section and wherein the element is made of a work hardening material.

BRIEF SUMMARY OF THE INVENTION

In the practice of the present invention, a relatively thin strip of metal is formed into a band and is then further formed so as to be convoluted or undulating in cross section. For example, the band may be shaped so that it is substantially E-shaped in cross section, or it may have additional completely reversing convolutions.

Such an element, when compressed in the axial direction, will first yield resiliently, like a spring, with the force required to effect the compression increasing substantially linearly with the amount of compression. At a certain amount of compression, the yield strength of the material of the element in at least one axial region of the element will be reached and the element will then commence to undergo plastic deformation.

By selecting the material of the element from the class of work hardening metals, such as Inconel X or certain stainless steel alloys, and by properly contouring the element, when the element is compressed to the point that an axial region thereof is stressed to the elastic limit and commences to undergo plastic deformation, the element will begin to work harden, commencing at the said axial region and will thereafter offer substantially constant resistance to deformation up to the point that the element commences to flatten out.

When plastic deformation of the material of a properly configured element of the nature referred to commences to take place, the material of the element will harden progressively along the length of the element and the force required to compress the element will remain substantially constant once work hardening of the material thereof has commenced.

The novel characteristic described above of the metallic element of the present invention presents the advantages that the element has the same load characteristics over a relatively wide range of compression thereby making one and the same element useful in a plurality of different arrangements and also permits greater machining tolerances for the members between which the element is compressed and permits the resistive effect of the element to be precisely predetermined.

The exact nature of the present invention will become more clearly apparent upon reference to the following detailed specification taken in connection with the accompanying drawings in which.

DETAILED DESCRIPTION OF THE INVENTION

Figure 1:
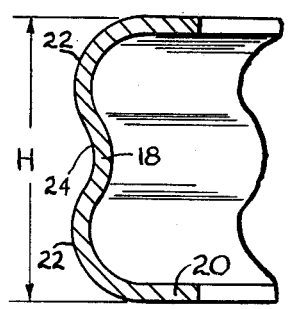
FIG. 1 is a sectional view through a tubular metallic element showing the element in uncompressed condition.

Referring to the drawings somewhat more in detail, FIG. 1 shows a typical tubular metallic element according to the present invention before assembly with the members which it is to engage and be compressed between. In FIG. 1, the element will be seen to be formed of a strip of metal 18 pressed or rolled to the desired configuration. The element has flat end parts 20 and each part at its outer extremity joins a circular part 22 with the two circular parts being connected by an oppositely curved circular part 24.

The completed element, or ring, in cross section is thus somewhat E-shaped and consists of smoothly joined curved convolutions. In the uncompressed condition in which the element is shown in FIG. 1, the end parts 20 are substantially parallel with each other and the outer faces thereof are spaced apart a distance H.

Figure 2:
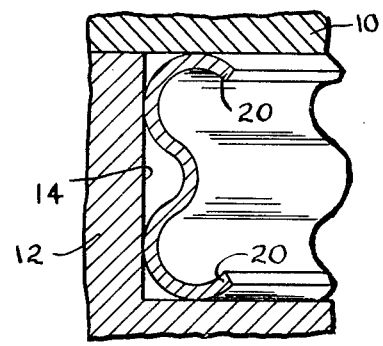
FIG. 2 is a view like FIG. 1 but shows the element partially compressed.

FIG. 2 shows the ring or element compressed in a counter bore 14 in a member 12 by a second member 10. During compression of the element or ring, a region of contact of the element with members 10 and 12 is established which is a relatively narrow band extending completely around each end of the element, and the end parts 20 having deflected slightly toward each other.

The elements illustrated may be readily confined if so desired or may have a certain amount of radial clearance thereabout. Substantially the same performance characteristics pertain once plastic deformation of the metallic element has commenced, except that a ring which is closely confined in the radial dimension will expand and become somewhat tightly engaged with the confining bore 14.

The metallic elements, or ring, according to the present invention has the important characteristic of deforming at a substantially constant force over a relatively wide range of axial distance. For this reason, the machining tolerances that must be observed in providing the space for the metallic element are substantially broadened and machining costs are thereby substantially reduced. Furthermore, the metallic element is adapted to a wide range of uses.

In respect of the constant load at which the element compresses, this feature is valuable when using the element as a load ring to preload bearings and seal rings and the like.

Figure 3:
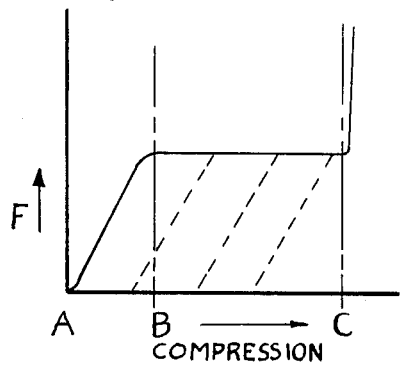
FIG. 3 is a graph showing the relation between the amount of axial compression of the metallic element and the force applied thereto as the element is compressed.

FIG. 3 illustrates graphically the manner in which an element according to the present invention performs when it is compressed. The material of the metallic element is a strong ductile metal, such as precipitation hardening nickel alloys, or austenitic stainless steels which will sustain substantial deformation without fracture.

When the metallic element is compressed, the material thereof is compressed to the yield strength and commences to deform permanently. The materials referred to are characterized in that, as the material undergoes plastic deformation, there is an increase in the yield strength of the material so that, instead of the metallic element collapsing further at reduced force, the force required to obtain further deformation of the element remains substantially constant.

The characteristic of increasing yield strength with progressive deformation is often referred to as "work hardening" or "strain hardening" and metallic materials having sufficient primary yield strength and being characterized in undergoing work hardening or strain hardening are suitable materials for elements according to the present invention. Specific examples of such materials are 18-8 stainless steel known as alloy AISI 304 and Inconel X. Other materials of similar ductility and yield strength can also be employed.

Referring to FIG. 3, the element deforms elastically over to about the ordinate marked B and from this point over to about the ordinate marked C undergoes plastic deformation.

During plastic deformation, work hardening of the metal of the element occurs so that, instead of collapsing, the element stiffens in the region of maximum stress, or deformation thereof, and further compression of the element causes another region to work harden. The work hardening of the element, due to the shape thereof, progresses axially along the length thereof as compression of the element proceeds. Beyond the ordinate marked C, the element has become flattened into the form of a multilayered washer and is a substantially noncompressible element.

In the range between ordinates B and C, however, and which represents a substantial axial dimension, the amount of force acting to compress the metallic element remains substantially constant. It will be apparent that the load conditions established by the metallic element will remain substantially constant over a wide range of axial compression of the elements so that, even with relatively wide tolerances in the machining of the parts between which the element is disposed, reliable and predictable load conditions will be had.

Figure 4:
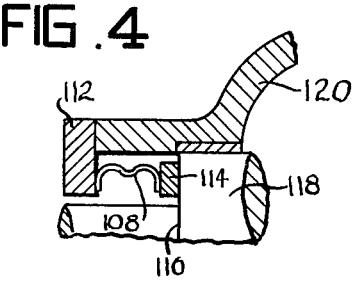
FIG. 4 is a schematic view showing how a metallic element according to the present invention could be arranged so as to have a static sealing region at one end and at the other end comprising a dynamic seal and functioning as a load ring.

In FIG. 4, an element 108 is illustrated which engages a cover member 112 while at its other end element 108 carries ring 114 seating against shoulder 116 of a shaft 118 which is journaled in housing member 120 to which cap 112 is secured. In FIG. 4, element 108 serves primarily as a load ring to exert a substantially constant predetermined force on ring 114 but may also seal on cover member 112, if provided with a suitable coating or gasketing layer interposed therebetween.

The construction of an element according to the present invention requires the selection of a semi-circular convolute form or portion thereof which will properly balance the work hardening or strain strengthening effect that strengthens the convolution against the effect of radial expansion of the convolution which will weaken the convolution.

Figure 14:
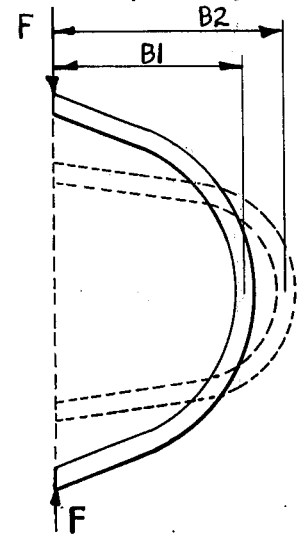
FIG. 14 is a section view of one convoluted part from the view of FIG. 9 and shows the change in geometry after further axial deformation.

In FIG. 14, the radial dimension designated as B on the diagram is seen to increase as the axial dimension of the convolution is decreased. Further understanding of these effects and the proper combination thereof to achieve a ring according to the present invention with the desired properties will be explained with the following analysis.

Figure 9:
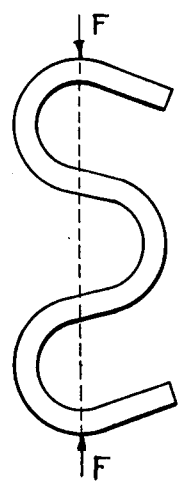
FIG. 9 is a view like FIG. 1 showing the metallic element in a state of stress with force applied.
Figure 10:
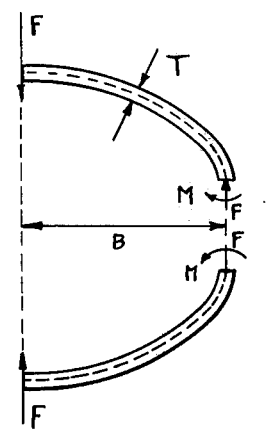
FIG. 10 shows a portion of the view of FIG. 9 which includes only one convolution separated diagrammatically to show the forces and moments transmitted through the section.

FIG. 9 shows a ring in a state of stress imposed by the axial force F. FIG. 10 shows a view of the central convolution only of the ring broken out for the purpose of indicating the forces and moments transmitted at that part having the greatest amount of permanent deformation. It is important to note that the force F is applied to the convolution as a shear force so that the progressive deformation within the convolution does not occur at the ends of the convolution.

The forces and moments required to maintain static equilibrium are indicated on FIG. 10. The moment at the part of greatest stress equals the quantity F times B where B is the radial dimension of the convolution measured from the end of the convolution to the midpoint of the thickness of the material usually called the neutral axis (see FIG. 9).

Figure 11:
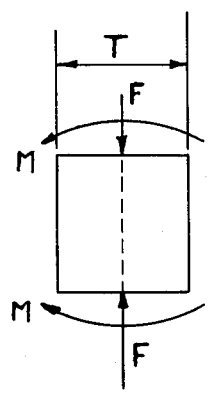
FIG. 11 is a free body diagram of a unit element of material taken at the separated portion of FIG. 10 to show the static equilibrium of forces and moments to be evaluated.

FIG. 11 shows a conventional free body diagram of a very small unit element taken adjacent to the separation shown on FIG. 10, namely, at the outer tip of the convolution. For convenience in the following calculation, the width of the element in the direction perpendicular to the plane of the figure will be evaluated as pi (3.1416) units so that the results of the calculation will be evaluated in terms of the force applied to a ring which is one unit in diameter.

The conventional methods used for evaluation of elastic stress on a unit element of FIG. 11 gives $$S = \pm Mc/I - F/A \tag{1}$$

where M is the applied moment equal to F times B, S is the tensile (+) or compressive (−) fiber stress located $c$ distance from the neutral axis of the unit element in the lateral direction; I is the moment of inertia of the element area taken about the neutral axis and equal, in the present case, to (pi) $T^3/12$ whereby the effect of curvature of the ring is neglected, and A is the area under stress equal to (pi) T in the present case.

Figure 12:
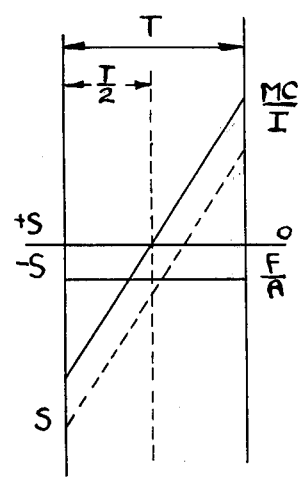
FIG. 12 is a diagram showing the ideal elastic distribution of stress in a unit element of FIG. 11.
Figure 13:
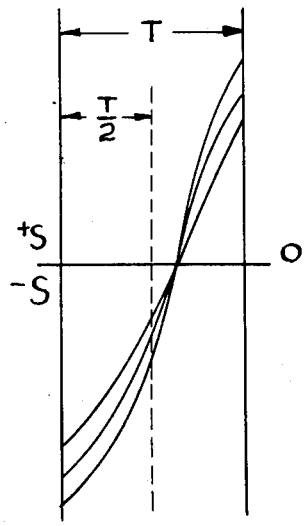
FIG. 13 is a diagram like FIG. 12 showing the approximate stress distribution after work hardening of the metal has occurred.

The foregoing relation is graphically described in FIG. 12 which shows the stress components as solid lines and the values of S as a dashed line with the vertical lines representing the boundaries of the thickness of the element strip. It is well known that this relationship is not valid for materials stressed beyond the elastic limit wherein the actual distribution of stress will progress in a manner more accurately shown in FIG. 13 as permanent deformation and the resulting strain strengthening is increased. Examination of data from compression experiments on load elements according to the present invention has revealed that the above relationship for an elastic state of stress can be extended for evaluation of the constant force required for compression when the fiber distance to the neutral axis, c, is replaced by $$c = y - \frac{0.713y^2}{B} \quad (2)$$

and then the foregoing relationship for stress (1) becomes $$S = \pm \frac{M}{1}\left[y = \frac{0.713y^2}{B}\right] = \frac{F}{A} \quad (3)$$

Evaluation of the new expression in terms of the geometry of the convolution of FIG. 10 at the element of FIG. 11 gives the surface tensile fiber stress at $y = T/2$ as $$S = \frac{F}{(\text{pi})\,T}\left[\frac{6B}{T} = 3.14\right] \quad (4)$$

The coefficient 0.713 applied in the earlier equation is an empirical value selected to fit a small quantity of experimental data and may require some change for a larger data sample. The coefficient, however, has yielded acceptable results for predicting the force to compress a ring according to the present invention for engineering purposes when the value of the ultimate tensile strength of the material is substituted for S.

The following table compares the results obtained from using this equation with experimental data from twelve different ring cross section geometries. The dimensions of each cross section refers to the dimensional symbols of FIG. 7 and FIG. 8.

gressive yielding and does not influence the foregoing method of calculation.

FIG. 14 shows one convolution of a ring according to the present invention at two stages of deformation after the force for constant force deformation has been imposed. The radius and thickness of the convolute section must be selected so that the instability under compression caused by the increasing of dimension B referred to above from B1 to B2 is precisely balanced by the strain strengthening of the material.

It is known, for example, that toroidal forms or metal O-rings fabricated of work hardening materials will behave as constant force compression elements only for a certain wall thickness for a given tube diameter. The force relationship for a toroid, i.e., a ring which is substantially round in cross section, such as a hollow metal "O" ring, is similar to that described above except that the points of application of force in such a ring continually shift as axial deformation increases because of the flattening of the toroidal shape at the regions of contact of the members which apply the compressing force. This fattening causes a substantially higher force to be required compared to a convolution of similar dimensions incorporated into a ring according to the present invention.

In practice, the desired convolute form for the present invention is obtained by selecting a convolute having known constant force properties or by experiment to achieve the proper radius of convolute arc to be compatible with a given strip thickness. Generally, the radius of a convolute may be easily changed to a smaller value at a greater depth B for a given dimension H in order to correct the effect of gradually increasing force with progressive deformation or the reverse may be done if the force of compression is observed to decrease with the progress of axial deformation.

From the foregoing table it will be seen that several radius forms may be used with success with a particular thickness dimension when the convolute arc is less than 180°. In such cases the adjoining convolutions must be designed such that the line of action of the compressing force will pass through the points corresponding to the ends of the central convolute arc, or arcs, if five or more convolutions are employed. These adjoining convolutions may or may not be of the same radius and arc

| CALCULATED AND EXPERIMENTAL VALUES OF COMPRESSION FORCE FOR 304 STAINLESS STEEL LOAD RINGS OF DIFFERENT DIMENSIONS HAVING THREE CONVOLUTIONS. | | | | | | |
|---|---|---|---|---|---|---|
| H INCHES | R1 INCHES | R2 INCHES | B INCHES | T INCHES | COMPRESSION FORCE, POUNDS/INCH OF RING DIAMETER | |
| | | | | | CALCULATED[1] | EXPERIMENTAL[2] |
| 0.172 | 0.0275 | 0.0275 | 0.0175 | 0.015 | 1037 | 1200 |
| 0.178 | 0.029 | 0.029 | 0.017 | 0.010 | 378 | 400 |
| 0.190 | 0.031 | 0.031 | 0.031 | 0.008 | 116 | 135 |
| 0.190 | 0.030 | 0.030 | 0.030 | 0.010 | 180 | 210 |
| 0.263 | 0.045 | 0.055 | 0.022 | 0.010 | 266 | 265 |
| 0.263 | 0.044 | 0.056 | 0.020 | 0.012 | 466 | 500 |
| 0.263 | 0.0425 | 0.0545 | 0.022 | 0.015 | 706 | 700 |
| 0.282 | 0.051 | 0.047 | 0.021 | 0.014 | 638 | 640 |
| 0.282 | 0.048 | 0.050 | 0.021 | 0.020 | 1688 | 1700 |
| 0.288 | 0.0435 | 0.0515 | 0.0275 | 0.027 | 2425 | 2400 |
| 0.306 | 0.046 | 0.056 | 0.030 | 0.031 | 3110 | 3400 |
| 0.410 | 0.070 | 0.080 | 0.034 | 0.010 | 155 | 155 |

[1]Calculated values based on 85,000 psi. ultimate tensile strength, slide rule accuracy.
[2]Average values from several tests on various diameter rings. Actual material thickness may vary approximately 0.0005 inches from nominal listed values of T.

It must be emphasized that the foregoing calculations are an approximation since they do not account for the particular stress versus strain relationship of the strain strengthening material. The relationship between the radius of the convolute arc and the material thickness determines the behavior of the convolution under prodepending upon what is required to meet the aforementioned condition.

Figure 8:
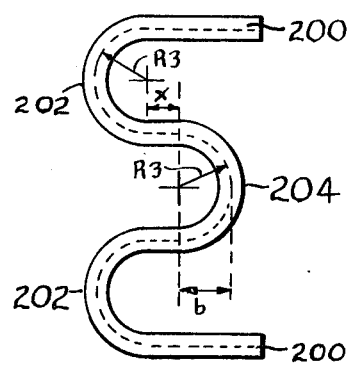
FIG. 8 is a sectional view like FIG. 8 but shows a further modification.

In the case of FIG. 8, the convolute arcs are spaced apart by a small annular region X and the three convolute arcs are 180° and having the same radius R3. In this case the end regions 200 will remain parallel during compression and the line of force will act at the median radius between the extremities of the convolute arcs. The distance B is not increased by the annular connecting distance X because the latter region transmits the force F primarily as a shear force and has substantially no effect on the magnitude of the required compression force.

Figure 7:
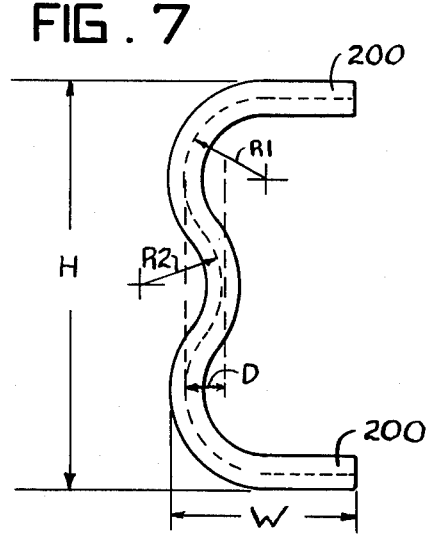
FIG. 7 is a view like FIG. 1 showing certain indicated dimensions pertaining to a specific example of the invention.

In the case of a ring having a convolute arc less than 180° as shown in FIG. 7, the line of action of the force also acts at the median distance between the extremities of the convolute arcs and often requires that the outer convolute parts have a smaller radius of arc. During initial compression of this ring form a small amount of permanent deformation occurs at the outermost regions of the outer convolute arcs as the force reaches an equilibrium position at the line of action previously described. During this period of deformation the end regions 200 curl slightly toward each other. This causes the initial curve describing the load versus deflection in FIG. 3 to be partially in elastic so that elastic recovery from any intermediate point on that curve between the origin and point B will return to a point on the abscissa slightly to the right of the origin.

Referring again to FIG. 3, it will be seen that several dashed lines are indicated and represent the elastic recovery during decompression after initial deformation to various points between B and C on the figure. The dashed lines or springback curves are parallel to each other and represent an important property of rings made according to the present invention.

For example, a bearing can be installed and clamped in place with the load ring in order to permit a wide variation in the space allowed for said ring and subsequently the ring is compressed by a predetermined additional amount which will cause it to exert a smaller known force compared to the force required for deformation, said smaller force resulting in a proper preload on the installed bearing after release of the said additional compression. Such assemblies can be easily accomplished by merely assembling the parts with the addition of a thin metal shim of a thickness equal to the springback required to obtain the required preload, whereupon removal of said shim and reassembly of the parts will result in clamping the assembly at the desired preload.

If the shim is selected to be of a thickness equal to the total characteristic springback of the load ring plus a desired axial clearance dimension then that clearance will result in the final assembly. The force of compression F as calculated in the foregoing is selected to exceed the axial forces which might be imposed upon the load ring during operation of the machine or assembly in which it is to be used. When used to properly install antifriction bearings the compression force is also selected to be slightly below the threshhold force that would cause surface damage to the rolling bearing elements.

If an element according to the present invention were to be compressed repeatedly into the range of plastic compression thereof, and released following each compression, a plurality of parallel load-deflection curves, shown in dashed line in FIG. 3, would result with the position of each thereof representing the period of plastic deformation corresponding to the respective compression cycle falling on one and the same substantially horizontal line common to all of the curves.

Thus, after the element is released following each compression thereof into the range of plastic deformation thereof, the element is shorter than the initial length thereof but possesses substantially the same characteristics except for a reduced range of axial compressibility thereof in the period of plastic deformation.

Figure 5:
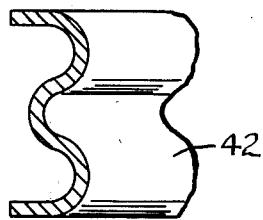
FIG. 5 is a fragmentary view showing a modified form for a metallic element according to the present invention.

FIG. 5 shows an element 42 which is essentially an inversion of the element shown in FIGS. 1 and 2.

Figure 6:
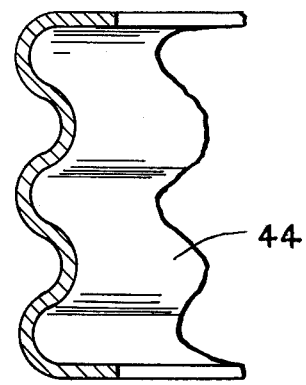
FIG. 6 is a sectional view showing the forming of the metallic element with additional convolutions to give it a greater range of compressibility.

In FIG. 6, an element 44 has added convolutions and can thus be made substantially longer than the elements of FIGS. 1, 2 and 5 without also enlarging the radial dimension of the cross section of the element. The element of FIG. 6 operates according to the same principles as have already been described but has a substantially greater range of constant load compression and greater resilience.

The radial thickness W of the ring shown in FIG. 7 may be varied without affecting the performance of the load ring provided that this dimension is at least as large as the radius R1. Often it is convenient to use rather large flanges with dimension W equal to two or four times the radius R1 so that the ring may be installed against the inner member of a ball bearing or tapered roller bearing such that the line of action of the compression force will be radially spaced away from the rounded corners usually manufactured on such bearings.

Similarly, the inverted form shown in FIG. 5 may be used adjacent to the outer member of a bearing element when the flanges are sufficiently wide to prevent the line of action of the compressing force from acting on the rounded outer corners of such bearings. By this means the load ring which is usually rather small in comparison to a bearing element is not permitted to become pinched or distorted in the crevice between the bearing corner and the shaft or bore to which the bearing is assembled.

Modifications may be made within the scope of the appended claims.

I claim:

1. A deformable tubular metallic member compressible in the axial direction thereof from a predetermined free length to a substantially shorter length and comprising: a circumferentially continuous tubular metallic element having a relatively thin wall of substantially uniform thickness throughout, said element in longitudinal cross section comprising an odd number of at least three curved convolutions in end to end relation and adjacent ones of said convolutions being concave in respectively opposite radial directions, substantially radial circumferentially continuous flange means extending radially from the axially outermost ends of the axially outermost ones of said convolutions, each convolution when viewed in cross section in unstressed condition being in the form of a segment of a circle, said convolutions being joined together substantially directly and each convolution in cross section extending over a range of substantially less than 180 degrees, said tubular element being formed of a relatively hard and ductile material characterized in undergoing pronounced strain strengthening when progressively strained beyond the elastic limit thereof, said axial deformation causing said convolutions progressively to increase in radial thickness commencing at the peaks thereof, said increasing of radial thickness being in proportion to said strain strengthening of said material, whereby upon progressive reduction of the axial length of said tubular element from the free length thereof by the application of compressive forces to the flange means at the opposite ends thereof the tubular element will undergo first a period of substantially resilient deformation while the length thereof is reduced from said free length to a shorter length, followed by a second period of permanent plastic deformation during which the axial length of the tubular element is further reduced, said element progressively work hardening in the axial direction commencing with the peaks of the convolutions during the said second period of plastic deformation, the compressive forces acting on the tubular element increasing substantially linearly during the major portion of said first period and remaining substantially constant during said second period, said reduction of axial length of said tubular element during said second period being equal to a substantial portion of the axial length of said element, removal of said compressive forces acting on said tubular element prior to complete flattening of said tubular element resulting in a resilient increase in axial length of said tubular element, said resilient increase in axial length of said element remaining substantially constant throughout said second period of plastic deformation of said element.

2. A tubular member according to claim 1 in which said tubular element has three convolutions only therein and is substantially E-shaped in longitudinal cross section.

3. A tubular member according to claim 1 in which the number of convolutions in said tubular element is an odd number greater than three.

4. A tubular member according to claim 1 which includes a relatively narrow conical region connecting each convolution to the one next adjacent thereto and tangent to the respective said convolutions, each said convolution being in the form of a segment of a circle having less than 180 degrees of arc.

5. In combination: a pair of parts movable axially relative to each other and presenting opposed parallel planar surface portions, a relatively thin walled tubular metallic element disposed between said planar surface portions and confined therebetween and in engagement therewith, said tubular element comprising an odd number not less than three of smoothly joined curved convolutions in end to end relation and substantially radial flanges at the outermost ends of the outermost ones of said convolutions, said tubular element being formed of a relatively hard but resilient and ductile work hardenable metal, said tubular element having a wall of uniform thickness, the free length of said tubular element before axial compression being such an amount greater than a predetermined confined length thereof that when the tubular element is axially compressed and deformed to said predetermined confined length, the element undergoes a first period of resilient deformation and then the yield pcint of the metal in the said convoluted portion of the tubular element at the peaks of the convolutions is exceeded and the said convoluted portion of the tubular element is caused to undergo plastic deformation with the metal of the element work hardening progressively in the axial direction of each convolution, and means for fixing said parts together with said element compressed therebetween at a length not greater than said predetermined confined length plus the axial springback of said element.

* * * * *